United States Patent [19]

Brewer et al.

[11] 4,062,195
[45] Dec. 13, 1977

[54] METHOD OF BEDDING A CONDUIT USING CONTROLLED DENSITY FILL MATERIAL

[75] Inventors: William E. Brewer, Toledo, Ohio; Franklin V. Zimmer, Southfield, Mich.

[73] Assignee: K-Krete, Inc., Toledo, Ohio

[21] Appl. No.: 637,407

[22] Filed: Dec. 3, 1975

Related U.S. Application Data

[62] Division of Ser. No. 475,579, June 3, 1974.

[51] Int. Cl.² .................... F16L 1/04; C04B 13/22; B63B 35/04
[52] U.S. Cl. .................................................... 61/72.4
[58] Field of Search ....................... 61/72.4, 35, 36 B; 106/97, 98, DIG. 2; 166/292, 293

[56] References Cited

U.S. PATENT DOCUMENTS

| | | | |
|---|---|---|---|
| 1,782,748 | 11/1930 | Smith | 106/DIG. 1 |
| 2,250,107 | 7/1941 | Nelles | 106/98 |
| 2,414,734 | 1/1947 | Gelbman | 106/97 |
| 2,527,766 | 10/1950 | Rule | 106/97 |
| 2,622,984 | 12/1952 | Keyishian | 106/89 |
| 3,719,511 | 3/1973 | Bevard et al. | 106/97 |

*Primary Examiner*—Paul R. Gilliam
*Assistant Examiner*—A. Grosz
*Attorney, Agent, or Firm*—Merchant, Gould, Smith, Edell, Welter & Schmidt

[57] ABSTRACT

The invention relates to a controlled density fill material and a method of using such fill material in, for examples, the backfilling of sewers, embankments, structures and utility trenches. The material includes Portland cement, fly ash and aggregates. The material, while having some properties of both, is neither a soil nor a concrete.

3 Claims, No Drawings

METHOD OF BEDDING A CONDUIT USING CONTROLLED DENSITY FILL MATERIAL

This is a division, of application Ser. No. 475,579 filed June 3, 1974.

BACKGROUND OF THE INVENTION

The backfilling of sewers, embankments, structures and utility trenches, for example electrical, gas and water conduits, has often created a problem in the past. This is particularly true where, for example, a pavement or other structure must be placed over a backfilled sewer. If a sewer line was installed by using, for example, an open trench method of construction and if poor soil conditions were present, the normal method of construction to obtain the desired compaction of the backfill material was to remove the original soil and replace it with sand, the original material or other specified backfill soil. In addition, it was often necessary to backfill in layers, often as small as three inch layers, and then mechanically compact these layers. While the results were satisfactory, this was a very expensive method of construction.

A similar problem was encountered if the soil bedding was so poor that it had to be removed and replaced with an adequate bedding material for the conduit. It is very important to have a proper bedding under conduits so that the resulting forces are equalized throughout the length of the conduit. For example, if rigid pipe is utilized as the conduit material, and if the bedding does not uniformly support the conduit throughout its length, there is a tendency for the conduit to shear or otherwise fail. In the case of flexible pipe, proper backfill is necessary to insure passive resistance pressure, otherwise the pipe will fail by excessive deflection.

To backfill the trench with, for example, a concrete is also not a proper solution. For example, if a sanitary sewer is being backfilled, and the backfill material is concrete, it is very difficult if not impossible to dig downwardly through the concrete to either repair a break in the line, install a lateral sewer connection into the main line, or make a house tap.

The present invention is directed to solving the above problems and consists of a controlled density fill material. The controlled density fill material, while including Portland cement as one of its constituents, is not a concrete as the term is normally used in the construction industry. A conventional concrete has an average concrete comparison 28-day compressive strength of 4000 psi while the controlled density fill material, according to the present invention, has a compressive strength preferably less than 1600 psi. In fact, when utilized in backfilling a sewer conduit, the preferred material, according to the present invention, has a compressive strength in the range of 200 psi.

On the other hand, the controlled density fill material, according to the present invention, is not a soil as that term is typically used in the construction industry. Rather than having to compact individual layers of the controlled density fill material, according to the present invention, one needs only to place the mix into the trench. The material, because it does not have the structural strength of concrete, may be re-excavated, for example, by using a trencher, in order to reach the pipe to make a repair or to make a connection for a future lateral line.

Furthermore, because the controlled density fill material does not have the rigid structural strength of concrete, it is also an excellent material for use in backfilling adjacent a structure, for example against a bridge abutment. It may also be placed in embankments in place of the customary earth compaction system of construction.

SUMMARY OF THE INVENTION

The present invention relates to a controlled density fill material and a method of using such fill material. The material is a composition which has a compressive strength of not greater than about 1600 psi. The controlled density fill material, according to the present invention, comprises 3% to 6% by weight of Portland cement, 1% to 4% by weight of fly ash, 75% to 90% by weight of aggregate and 5% to 15% by weight of water. In its broadest form, the controlled density fill material comprises 2% to 6% by weight of Portland cement, 1% to 10% by weight of fly ash, 70% to 90% by weight of aggregate and 5% to 15% by weight of water.

After the original soil is removed or an original structure built, it is replaced with controlled density fill material, according to the present invention, or in the alternative such fill material is used as backfill around structures or for embankments. The controlled density fill material does not experience the settlement that is common with conventional soil backfill material.

DESCRIPTION OF THE PREFERRED EMBODIMENTS

The controlled density fill material, according to the present invention, is neither a concrete nor a soil. The fill material is generally comprised of Portland cement, fly ash, aggregate and water. However, the fill material made from these ingredients has a compressive strength preferably below 1600 psi and often as low as 100 psi.

Portland cement — fly ash compositions are well known in the prior art. Nelles U.S. Pat. No. 2,250,107 discloses a concrete composition including Portland cement, fly ash and aggregate. However, the Nelles disclosure is directed to a structural concrete having compressive strengths over 2000 psi.

Keyishian U.S. Pat. No. 2,622,989 is directed to a cementitious structural composition which includes Portland cement, fly ash and aggregate. This patent discloses the use of such a cementitious structural composition in structural forms such as the building of blocks, panels and the construction of road surfaces.

Other uses of fly ash compositions, including the prior art usage as a soil stabilizer for roadway construction, are disclosed in a Bureau of Mines Information Circular No. 8483 entitled "Fly Ash Utilization: A Summary of Applications and Technology", John D. Capp and John D. Spencer (1970).

The preferred controlled density fill material, according to the present invention, has a compressive strength of less than 1600 psi and has the range of ingredients indicated below in Table A.

TABLE A

| Material | Percent by Weight |
| --- | --- |
| Portland Cement | 2 - 6 |
| Fly Ash | 1 - 4 |
| Selected Aggregate | 75 - 90 |
| Water | 5 - 15 |

Fly ash, as used in the present specification and claims, includes any ash residue from the burning of coal, including cinder material and bottom ash as well as the gray, finely divided ash which is collected by electrostatic precipitators or mechanical collectors in, for example, a power plant operation. A commercially available fly ash suitable for use in the instant invention is designated as Trenton Channel Fly Ash. The Trenton Channel Fly Ash analysis is indicated below in Table B.

TABLE B
TRENTON CHANNEL FLY ASH

| Chemical Analysis | Percent of Dry Weight |
|---|---|
| $Fe_2O_3$ | 21.0 |
| $Al_2O_3$ | 25.0 |
| MgO | 1.0 |
| CaO | 1.8 |
| $Na_2O$ | 0.4 |
| $K_2O$ | 1.5 |
| $TiO_2$ | 1.3 |
| $SiO_2$ | 48.0 |
|  | 100.0 |
| Loss on ignition | 5.89 |
| Actual Carbon | 5.43 |
| pH | 10.4 |
| Specific Gravity | 2.41 |
| Moisture | 0.28 |

The Portland cement utilized in the controlled density fill material, according to the present invention, is normally a Type I cement, certified to meet the requirements of ASTM C150. For example, a Huron Type I cement was utilized in the controlled density fill material, which is the subject matter of the examples reported below. However, other types of Portland Cement may be utilized.

The aggregates utilized are various types of granular materials that can be used as fillers. The selected aggregates would, of course, be locally selected materials. By way of examples, two types of aggregates which have been used in connection with controlled density fill materials, according to the present invention, are berm aggregates, obtained from a limestone processing company and Maumee Estuary sand. By way of examples, laboratory data relating to the berm aggregate is indicated below in Table C and data relating to the Maumee Estuary sand is indicated below in Table D.

TABLE C
BERM AGGREGATE

| Moisture Content, as used | 2.4% |
|---|---|
| Average Absorption | 1.3% |
| Total Percent Retained on ¾" | 8.0% |
| Total Percent Retained on ½" | 32.0% |
| Total Percent Retained on ⅜" | 57.0% |
| Total Percent Retained on #4 | 78.0% |
| Total Percent Retained on #8 | 90.0% |
| Total Percent Retained on #16 | 91.0% |
| Total Percent Retained on #30 | 94.0% |
| Total Percent Retained on #50 | 96.0% |
| Total Percent Retained on #100 | 97.0% |

TABLE D
MAUMEE ESTUARY SAND

| Moisture Content, as used | 4.2% |
|---|---|
| Absorption | 1.3% |
| Total Percent Retained on ⅜" | 0% |
| Total Percent Retained on #4 | 2.0% |
| Total Percent Retained on #8 | 12.0% |
| Total Percent Retained on #16 | 18.0% |
| Total Percent Retained on #30 | 41.0% |
| Total Percent Retained on #50 | 73.0% |
| Total Percent Retained on #100 | 91.0% |
| Fineness Modulus | 2.37% |

Many other types of granular materials may be utilized as aggregates in the fill material, according to the present invention.

The controlled density fill material may be utilized for several uses, however, all of these use require a compressive strength preferably below 1600 psi.

One use is as a backfill material when backfilling a sewer trench which will ultimately be beneath a pavement structure. In this situation, the soil is first excavated and the sewer conduit laid to its proper grade. The controlled density backfill material (see Example 1) is lowered or dumped into the trench over the sewer conduit and the trench is filled to its desired height. A concrete comparison 28-day compressive strength of this material is approximately 200 psi. This low strength allows the material to be recut or re-excavated easily with, for example, a backhole if it is necessary to make connections or repair the sewer conduit in the future.

The conduit backfill material preferably has a concrete comparison 28-day compressive strength of between 100 psi and 300 psi. The range of ingredients by percentage of total weight are as follows: 2% to 5% by weight of Portland cement; 2% to 9% by weight of fly ash; 74% to 86% by weight of aggregates; and 8% to 13% by weight of water.

EXAMPLE 1

Sewer Backfill Under Pavement Structure a. Concrete comparison 28-day compressive strength of 200 psi.

| Material | Weight (lb.) | % Total Weight (lb.) |
|---|---|---|
| Portland Cement | 167 | 4.0 |
| Fly Ash | 111 | 2.6 |
| Selected Aggregate | 3400 | 82.4 |
| Water | 450 | 11.0 |
|  | 4128 | 100.0 | b. Requirements -

Required 120 pcf. density backfill to be placed in sewer cut. Material strength is regulated to allow for lateral sewer cuts and further sewer placement of laterals. Unit weight of mix is 138 pcf.

c. Mixing procedures -

Conventional ready mix operation. Delivery to project site in ready mix truck or dump truck.

d. Construction procedure -

Actual backfill placement consists of dumping material into sewer trench. No placement operations required or labor other than material flow direction.

Another use of the present material is as an embankment fill or as a support fill around structures, for example, buildings or bridges. Referring to Example 2, below, a concrete comparison 28-day compressive strength of approximately 1000 psi is required. Forms are provided, either constructed forms or earth forms, and the material is normally delivered to the job site by truck. The material is then placed in the forms. This material has uniform density in its entirety which is an improvement over conventional fill practices.

Controlled density fill material which is used as embankment fill, fill for structures or pipe bedding has a range of ingredients by percentage of total weight as follows: 4% to 6% by weight of Portland cement; 2% to 9% by weight of fly ash; 75% to 90% by weight of aggregates; and 6% to 10% by weight of water.

EXAMPLE 2

Fill for Embankment or Around Structures a. A concrete comparison 28-day compressive strength of 1000 psi.

Mix proportions — cubic yard measure.

| Material | Weight (lb.) | % Total Weight (lb.) |
| --- | --- | --- |
| Portland Cement | 222 | 4.8 |
| Fly Ash | 333 | 7.3 |
| Selected Aggregates | 3600 | 78.7 |
| Water | 420 | 9.2 |
| | 4575 | 100.0 | b. Requirements -

Required compaction fill for embankments or structural support fill. Unit weight of granular fill and/or compressive strength to be at least 1000 psi at 28 days. Unit weight of designed mix (a) is 151.6 pcf. with strength at 28 days equal to 1014 psi.

c. Mixing procedures -

Conventional ready mix operation. Delivery to project site in ready mix truck or dump truck.

d. Construction procedure -

Placement consists of controlling fluidity of material in fill. Total fill heights may be placed depending on confinement conditions on the perimeter of the fill.

Another use of controlled density fill material, according to the present invention, is as a designed bedding for pipe. The pipe may be of several types, for example, vitrified clay tiles for sanitary sewers, reinforced concrete pipe for storm sewers, cast iron pipe for water lines and steel gas lines. It is most important that pipe be properly bedded to insure the uniform distribution of forces along the pipe. The original soil is removed and the controlled density fill material is placed below the pipe or conduit. Referring to Example 3, below, the controlled density fill material for this use has a compressive strength of approximately 1400 psi. While the bedding material is often placed only below the pipe, in some situations it is installed completely around the pipe.

EXAMPLE 3

Pipe Support or Bedding in Trench a. A concrete comparison 28-day compressive strength of 1400 psi.

Mix proportions — cubic yard measure.

| Material | Weight (lb.) | % Total Weight (lb.) |
| --- | --- | --- |
| Portland Cement | 222 | 4.8 |
| Fly Ash | 222 | 4.8 |
| Selected Aggregate | 3850 | 82.9 |
| Water | 350 | 7.5 |
| | 4644 | 100.0 | b. Requirements -

Required compressive strength of pipe support material — 1400 psi at 28 days.

c. Mixing procedures -

Conventional ready mix operation. Delivery to project site in ready mix truck or dump truck.

d. Construction procedure -

Placement in trench is accomplished by dumping material into trench for placement around pipe.

In the use of flexible pipe bedding and backfilling, controlled density fill is regulated to control the maximum limiting deflection of the pipe.

What we claim is:

1. A method for bedding a conduit which is laid in a trench, comprising removing the original soil and placing below the conduit a controlled density material consisting essentially of 2% to 6% by weight of Portland cement, 2% to 10% by weight of fly ash, 70% to 90% by weight of aggregate, and 5% to 15% by weight of water, the fill material being sufficiently placeable and flowable that tamping or vibrating is unnecessary and having a concrete-comparison 28-day compressive strength of less than 1400 psi, whereby the material may be easily re-excavated.

2. A method of bedding a conduit according to claim 1, wherein the controlled density fill material consists essentially of 4% to 6% by weight of Portland cement, 2% to 9% by weight of fly ash, 75% to 90% by weight of aggregate, and 6% to 10% by weight of water.

3. A method of bedding a conduit, according to claim 1, wherein the controlled density material consists essentially of about 4.8% by weight of Portland cement, about 4.8% by weight of fly ash, about 82.9% by weight of aggregate and about 7.5% by weight of water.

* * * * *